United States Patent
Iwasawa et al.

(10) Patent No.: US 11,128,523 B2
(45) Date of Patent: Sep. 21, 2021

(54) ELECTRONIC CONTROLLER AND COMMUNICATION APPARATUS

(71) Applicant: HITACHI AUTOMOTIVE SYSTEMS, LTD., Hitachinaka (JP)

(72) Inventors: Hiroshi Iwasawa, Tokyo (JP); Teppei Hirotsu, Tokyo (JP); Mitsuhiko Watanabe, Hitachinaka (JP)

(73) Assignee: HITACHI AUTOMOTIVE SYSTEMS, LTD., Hitachinaka (JP)

( * ) Notice: Subject to any disclaimer, the term of this patent is extended or adjusted under 35 U.S.C. 154(b) by 258 days.

(21) Appl. No.: 16/338,279

(22) PCT Filed: Oct. 24, 2017

(86) PCT No.: PCT/JP2017/038270
§ 371 (c)(1),
(2) Date: Mar. 29, 2019

(87) PCT Pub. No.: WO2018/084018
PCT Pub. Date: May 11, 2018

(65) Prior Publication Data
US 2019/0319834 A1 Oct. 17, 2019

(30) Foreign Application Priority Data
Nov. 2, 2016 (JP) .............................. JP2016-214780

(51) Int. Cl.
*H04L 12/24* (2006.01)
*H04L 12/40* (2006.01)
(Continued)

(52) U.S. Cl.
CPC .......... *H04L 41/0677* (2013.01); *H04L 12/40* (2013.01); *H04L 43/0817* (2013.01); *H04L 25/02* (2013.01); *H04L 2012/40273* (2013.01)

(58) Field of Classification Search
CPC . H04L 12/40; H04L 43/0817; H04L 41/0677; H04L 25/02; H04L 2012/40215;
(Continued)

(56) References Cited

U.S. PATENT DOCUMENTS

2003/0041197 A1* 2/2003 Hampel ................. G06F 13/37
710/107
2008/0253303 A1 10/2008 Stevens
(Continued)

FOREIGN PATENT DOCUMENTS

JP H11-353566 A 12/1999
JP 2009-508382 A 2/2009
(Continued)

OTHER PUBLICATIONS

International Search Report with English translation and Written Opinion issued in corresponding application No. PCT/JP2017/038270 dated Feb. 13, 2018.

*Primary Examiner* — Oussama U Dani
(74) *Attorney, Agent, or Firm* — Foley & Lardner LLP

(57) ABSTRACT

The present invention provides an electronic controller and the like capable of identifying the order of communication apparatuses connected to a bus while minimizing manufacturing cost. In the present invention, bus wiring 2 has one end connected to a port 111 and the other end connected to a port 112. A plurality of lower ECUs 301 to 304 are connected to the bus wiring 2. A current sensor CS measures current Is1 flowing through the port 111 and current Is2 flowing through the port 112 by applying current to the bus wiring 2 from each of the plurality of lower ECUs 301 to 304. The higher controller 12 identifies the order of the plurality of lower ECUs 301 to 304 on the bus wiring 2 on the basis of the current Is1 and the current Is2 which are measured for each of the plurality of lower ECUs 301 to 304.

8 Claims, 4 Drawing Sheets

(51) Int. Cl.
*H04L 12/26* (2006.01)
*H04L 25/02* (2006.01)

(58) Field of Classification Search
CPC . H04L 2012/40273; G06F 13/22; G06F 13/37
See application file for complete search history.

(56) References Cited

U.S. PATENT DOCUMENTS

| | | | |
|---|---|---|---|
| 2009/0110039 A1* | 4/2009 | Kort | H04B 3/54 |
| | | | 375/222 |
| 2010/0023663 A1* | 1/2010 | Bachhuber | H04L 12/4633 |
| | | | 710/110 |
| 2017/0077991 A1 | 3/2017 | Schenzinger | |
| 2017/0257262 A1* | 9/2017 | Dalal | H04L 43/50 |
| 2019/0113900 A1* | 4/2019 | Yoscovich | G05B 19/042 |

FOREIGN PATENT DOCUMENTS

| | | |
|---|---|---|
| JP | 2011-135624 A | 7/2011 |
| WO | WO-2015/131967 A1 | 9/2015 |

* cited by examiner

| ORDER OF IDS OF S/AS (DESIGN INFORMATION) | #1 | #2 | #3 | #4 |
|---|---|---|---|---|
| ORDER OF IDS OF LOWER ECUS (IDENTIFIED BASED ON DIFFERENCE BETWEEN CURRENT VALUES) | #D | #A | #C | #B | ary
ELECTRONIC CONTROLLER AND COMMUNICATION APPARATUS

TECHNICAL FIELD

The present invention relates to an electronic controller and a communication apparatus.

BACKGROUND ART

[Demand for Reducing Wiring]

In recent years, automobiles have been remarkably sophisticated, and along with this, the number of actuators or sensors mounted on vehicles has been increasing. Along with this, the weights and costs of wire harnesses for connecting higher electronic controllers (hereinafter referred to higher ECUs), for example, engine control ECUs and actuators or sensors (e.g., fuel injection devices) are also increasing. On the other hand, there is an increasing demand for reducing wiring of wire harnesses due to a demand for weight reduction to improve fuel economy or the like. Hereinafter, an actuator or sensor will be abbreviated to an actuator or the like.

A technique for reducing wiring of a wire harness used for connection between a higher ECU and actuators or the like efficiently replaces conventional separate wiring between the higher ECU and the actuators or the like with a common bus wiring to transmit and receive information between a source and a destination each specified with an ID or the like assigned to each ECU. At this time, an electronic controller (hereinafter referred to as a lower ECU) having a communication function is also required on the side of the actuators or the like.

[Bus Wiring and Problems Thereof]

The above-mentioned "bus wiring" is a connection form for connecting a plurality of electronic controllers to a common wiring. This connection form is characterized that a signal transmitted from one ECU is received by all the other ECUs. The bus wiring has advantages that the number of wiring lines and a structure of wiring are simplified compared to a conventional direct connection method, reducing the weight and cost of a wire harness.

On the other hand, the bus wiring also has a disadvantage. That is, the disadvantage is that a signal reaches all lower ECUs, and a higher ECU cannot distinguish whether a lower ECU with which the higher ECU communicates is in charge of which actuator or the like (For example, the higher ECU cannot distinguish whether a fuel injection device is attached to which cylinder. Hereinafter, referred to as a connection place.). In the conventional direct connection method, a connection place is uniquely corresponds to a connection port in number on the side of the higher ECU when forming a wire harness, and such a problem does not arise.

Even in the bus wiring, a method of making an ID correspond to a connection place upon assembly can be considered, as one solution. However, this method has disadvantages, such as an increase in man-hour for assembly and a risk of input error of combination information, and it is difficult to achieve an inexpensive highly reliable system.

In order to solve this problem, a method for automatically detecting a connection place is required. As such a method for automatically detecting a connection place, an example as described in PTL 1 is known. In this patent literature, a method of determining connection places ("mutual positions" in this patent literature) on the basis of time taken for a device in a network to measure a signal transmitted from one of the other devices in the network.

CITATION LIST

Patent Literature

PTL 1: JP 2009-508382 A

SUMMARY OF INVENTION

Technical Problem

On the other hand, the technique disclosed in PTL 1 has a problem that a high time measurement resolution is required when a distance between devices is short. Generally, in wired communication, a signal propagates at a speed of around 200,000 km/sec. Therefore, for example, when resolution for detecting a connection place having a round trip distance of 10 cm is required, time measurement resolution of approximately 1 nanosecond is required. In order to achieve this, a counter circuit or the like which operates at high speed is required, and a problem arises that cost increases.

For this reason, it has been impossible to identify the order of lower ECUs (communication apparatuses) connected to a bus while minimizing manufacturing cost.

An object of the present invention is to provide an electronic controller and the like capable of identifying the order of communication apparatuses connected to a bus while minimizing manufacturing cost.

Solution to Problem

In order to achieve the above object, the present invention includes a first port to which one end of a bus configured to connect a plurality of communication apparatuses is connected, a second port to which the other end of the bus is connected, a current sensor which measures a first current value of current flowing through the first port and a second current value of current flowing through the second port, the current being applied to the bus by each of the plurality of communication apparatuses, and a controller which identifies the order of the plurality of communication apparatuses on the bus on the basis of the first current value and the second current value measured for each of the plurality of communication apparatuses.

Advantageous Effects of Invention

According to the present invention, it is possible to identify the order of the communication apparatuses connected to the bus while minimizing manufacturing cost. Problems, configurations, and effects other than set force above will be apparent in the following description of the embodiments.

DESCRIPTION OF EMBODIMENTS

Hereinafter, the configurations and operations of an electronic controller and the like will be described according to first to third embodiments of the present invention with reference to the drawings.

Although partially overlapping the above-mentioned object, an object of the embodiment of the present invention is to provide, for example, a higher ECU (electronic controller) capable of automatically measuring connection positions of lower ECUs with high resolution without using a circuit requiring high-speed operation or an actuator or sensor including a lower ECU (communication apparatus).

First Embodiment

[Overall Structure]

Figure 1:
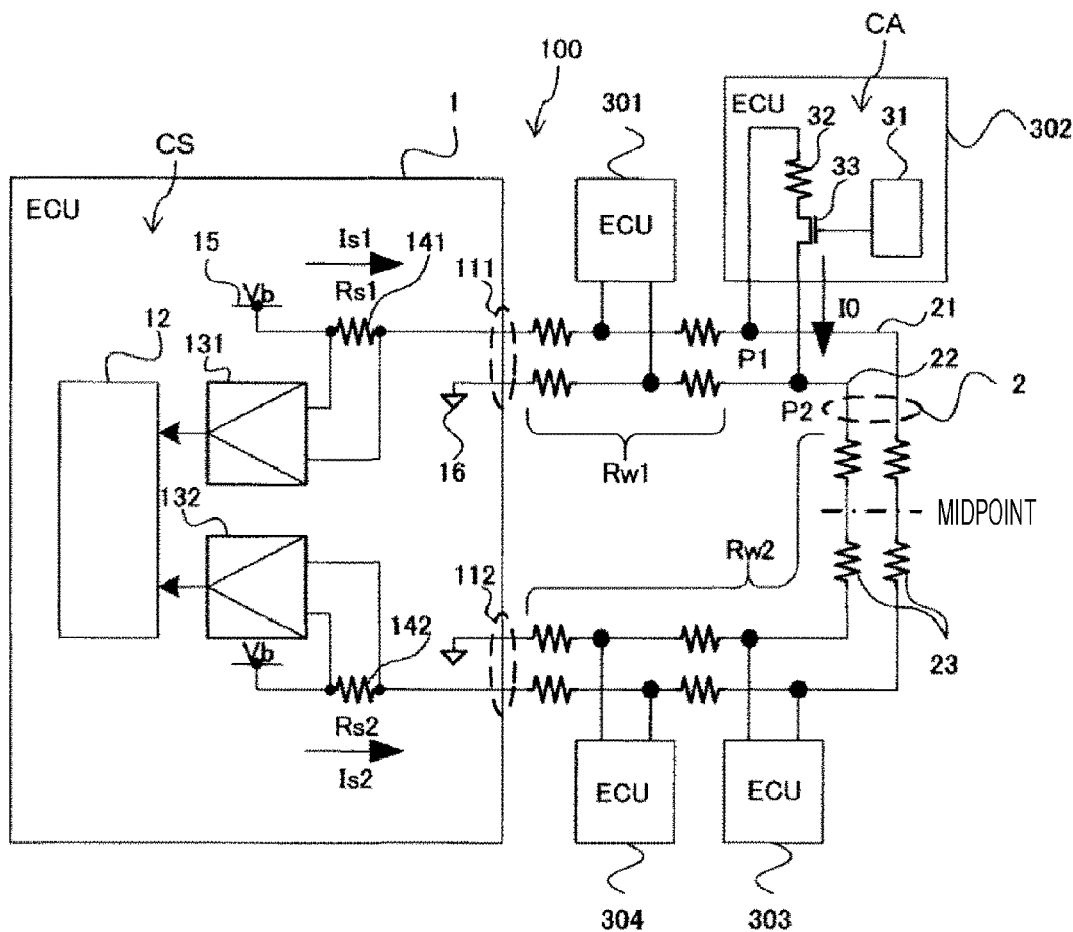
FIG. 1 is a circuit block diagram illustrating a connection configuration of an electronic controller and the like according to a first embodiment.

A configuration and operation of a system 100 including an electronic controller according to a first embodiment of the present invention will be described with reference to FIG. 1. The system 100 includes a higher ECU (the electronic controller), bus wiring 2, and a plurality of lower ECUs 301 to 304 (communication apparatuses).

The higher ECU 1 is connected to the bus wiring 2 at two ports 111 and 112, and the higher ECU 1 internally includes a higher controller 12, amplifiers 131 and 132, current detecting resistors 141 and 142, a power supply 15 of voltage Vb, and a GND 16.

The amplifier 131 amplifies voltage (voltage across the current detecting resistor 141) obtained by converting a current Is1 passing through the port 111 by the current detecting resistor 141, and inputs the voltage to the higher controller 12. Similarly, the amplifier 132 amplifies voltage obtained by converting a current Is2 flowing through the port 112 by the current detecting resistor 142, and inputs the voltage to the higher controller 12.

From the thus detected current Is1 and Is2, the higher controller 12 measures a connection place of, for example, the lower ECU 302 as a target. This measuring method will be described later.

The bus wiring 2 includes two wiring lines, that is wiring line 21 on the power supply side (high side) and wiring line 22 on the GND side (low side), and is connected to the higher ECU 1 at the ports 111 and 112 into a loop shaped wiring. Furthermore, the bus wiring 2 is also connected to the lower ECUs 301 to 304 in the middle of the bus wiring 2. These wiring have wiring resistances 23, and the values of the wiring resistances 23 are proportional to the lengths of the respective wiring.

In other words, one end of the bus wiring 2 (bus) is connected to the port 111 (first port), and the other end of the bus wiring 2 is connected to the port 112 (second port). The plurality of lower ECUs 301 to 304 (communication apparatuses) are connected to the bus wiring 2.

The lower ECUs 301 to 304 are connected to the bus wiring 2, and each internally include a lower controller 31, a load resistor 32, and a switch 33. The lower controller receives a command from the higher controller 12 according to a predetermined communication method (protocol) to turn on the switch 33 at any timing, passing a measurement current I0 to the bus wiring 2.

In other words, the bus wiring 2 (bus) includes the wiring line 21 (first line) and the wiring line 22 (second line). The load resistor 32 (resistor), the switch 33, and the lower controller 31 constitute a current applying device CA. The load resistor 32 and the switch 33 are connected in series between the wiring line 21 and the wiring line 22. When receiving a command to apply current to the bus wiring 2, the lower controller 31 (controller) turns on the switch 33.

That is, when receiving the command to apply current to the bus wiring 2, the current applying device CA changes impedance between the wiring line 21 and the wiring line 22 to pass current between the wiring line 21 and the wiring line 22.

Note that the higher controller 12 and the lower controller 31 each include a processor, a RAM, a ROM, an input circuit to which a signal is input via the bus wiring 2, an output circuit which outputs a signal via the bus wiring 2, and the like.

[Measurement of Connection Place]

Next, a method of measuring a connection place will be described. Here, an example of measuring a connection place of the lower ECU 302 of the plurality of lower ECUs will be described.

As described above, the lower ECU 302 is configured to pass the measurement current I0 to the bus wiring 2 in response to the command from the higher controller 12. The currents Is1 and Is2 are obtained by dividing the measurement current I0 by the wiring resistance or the like, and the currents Is1 and Is2 are measured by the higher ECU to measure the connection place from a relationship between the currents Is1 and Is2.

In other words, the higher controller 12 (controller) transmits the command to apply current to the bus wiring 2 (bus) to each of the plurality of lower ECUs 301 to 304 (communication apparatuses). The current detecting resistors 141 and 142, the amplifiers 131 and 132, and the higher controller 12 constitute a current sensor CS. The current sensor CS measures the current Is1 (first current value) flowing through the port 111 (first port) and the current Is2 (second current value) flowing through the port 112 (second port) by applying current to the bus wiring 2 from each of the plurality of lower ECUs 301 to 304. The higher controller 12 identifies the order of the plurality of lower ECUs 301 to 304 on the bus wiring 2 on the basis of the current Is1 and the current Is2 which are measured for each of the plurality of lower ECUs 301 to 304.

Here, a relationship between I0, the connection place of the lower ECU 302, and Is1 and Is2 will be described. When wiring resistance per wiring from the port 111 to connection portions (connection points P1, P2) of the lower ECU 302 is Rw1 and wiring resistance per wiring from the port 112 to the connection portions of the lower ECU 302 is Rw2, a value of Is1 and a value of Is2 are represented by Formulas 1 and 2, respectively.

[Mathematical Formula 1]
$$Is1 = I0 \times \frac{Rs2 + Rw2}{Rs1 + Rs2 + Rw1 + Rw2} \quad (1)$$

[Mathematical Formula 2]
$$Is2 = I0 \times \frac{Rs1 + Rw1}{Rs1 + Rs2 + Rw1 + Rw2} \quad (2)$$

Figure 2:
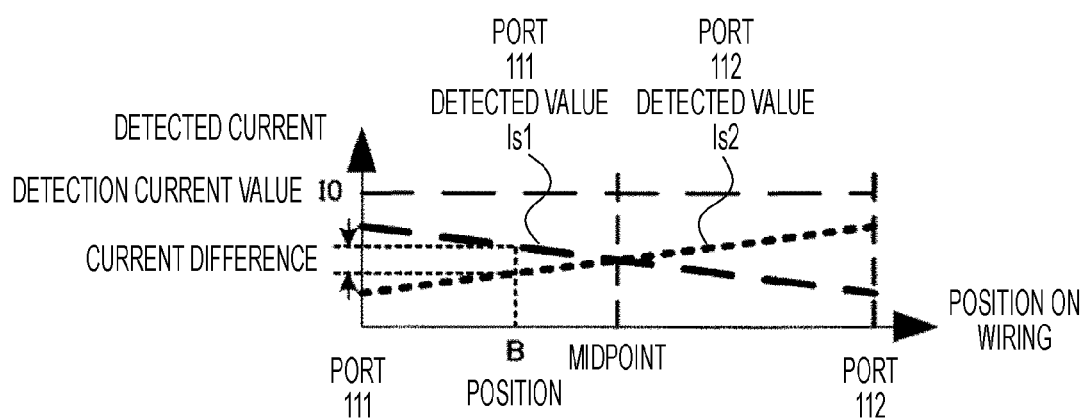
FIG. 2 is a graph illustrating a relationship between a connection position of a lower ECU and detected current in a higher ECU according to the first embodiment.

Rw1 and Rw2 are proportional to a distance from the port 111 to a connection portion of the lower ECU 302 and a distance from the port 112 to the connection portion of the lower ECU 302, respectively. Therefore, a relationship between the values of Is1 and Is2, which are detected currents, and the connection place of the lower ECU 302 (a position on the wiring) is shown in a graph as illustrated in FIG. 2. As can be seen from this graph, there is a unique relationship of a difference between Is1 and Is2 (Is1−Is2) to a position on the wiring. Specifically, when Rs1=Rs2=Rs for the sake of simplicity, Is1−Is2 is represented by Formula 3.

[Mathematical Formula 3]
$$Is1 - Is2 = I0 \times \frac{Rs2 + Rw2 - Rs1 - Rw1}{Rs1 + Rs2 + Rw1 + Rw2} \quad (3)$$
$$= I0 \times \frac{Rw2 - Rw1}{2 \times Rs + Rw1 + Rw2}$$

By using this, it is possible to measure the connection place (the position on the wiring) of the lower ECU 302. That is, the higher controller 12 (controller) identifies the order of the plurality of lower ECUs 301 to 304 on the bus wiring 2 (bus) on the basis of a difference between the current Is1 (the first current value) and the current Is2 (the second current value) which are measured for each of the plurality of lower ECUs 301 to 304 (communication apparatuses).

Furthermore, upon this calculation, using a value obtained by further dividing a value of Formula 3 by a sum of Is1 and Is2 (Is1+Is2=I0), as represented in Formula 4, I0 is eliminated from the formula, and stable measurement is performed without an error due to variations in I0. That is, the higher controller 12 (controller) identifies the order of the plurality of lower ECUs 301 to 304 on the bus wiring 2 (bus), on the basis of a ratio of the difference between the current Is1 (the first current value) and the current Is2 (the second current value) which are measured for each of the plurality of lower ECUs 301 to 304 (communication apparatuses), to the sum of the current Is1 and the current Is2.

[Mathematical Formula 4]
$$\frac{Is1 - Is2}{Is1 + Is2} = \frac{Rw2 - Rw1}{2 \times Rs + Rw1 + Rw2} \quad (4)$$

Note that, for many applications, it is not necessary to accurately determine the connection positions of lower ECUs. This is because, as described in the paragraph of "bus wiring and problems thereof", the purpose of measuring the connection positions is to determine whether each lower ECU is in charge of which actuator or the like, and, for this determination, it is enough to identify the order of the connection positions (a magnitude relationship between distances from each port of the higher ECU 1).

Furthermore, a denominator of Formula 4 shows that sensitivity decreases when the current detecting resistors 141 and 142 have a large resistance value Rs. In order to avoid this reduction in sensitivity as much as possible, it is effective to sufficiently reduce the value of Rs relative to Rw1 and Rw2.

In other words, the current sensor CS measures current by using the current detecting resistors 141 and 142 (shunt resistors), and the resistance values of the current detecting resistors 141 and 142 are smaller than a resistance value of the bus wiring 2 (bus) extending from the port 111 (first port) to the port 112 (second port).

Application Example

Figure 6:
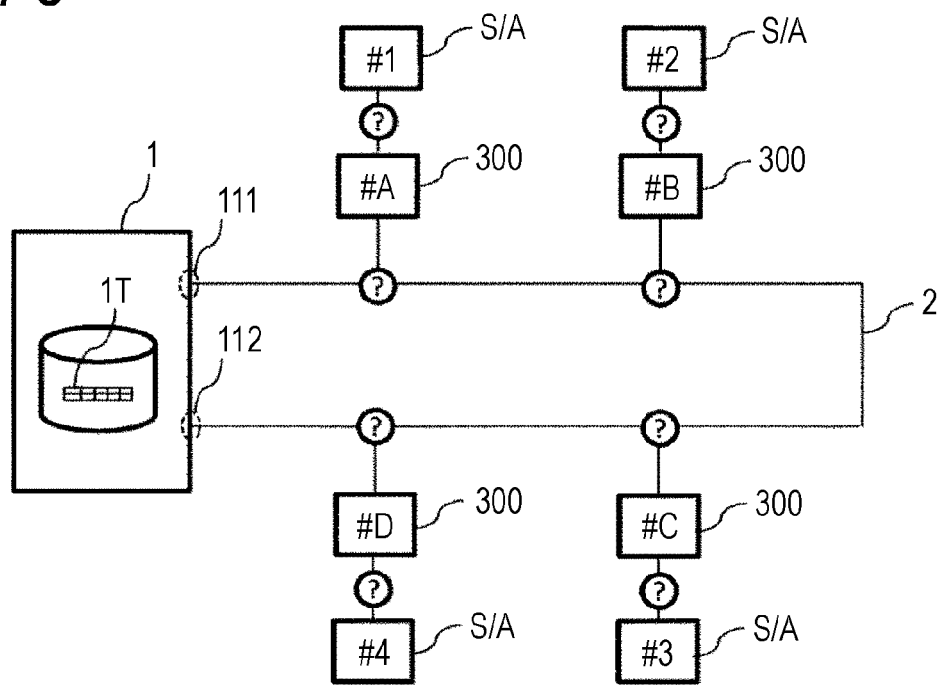
FIG. 6 is a schematic diagram illustrating a system before the order of lower ECUs is identified.

FIG. 6 is a schematic diagram illustrating a system before the order of lower ECUs is identified. One higher ECU 1 and four lower ECUs 300 are connected to the bus wiring 2. To each of the lower ECUs 300, a sensor or actuator (hereinafter abbreviated as S/A) is connected. The higher ECU 1 can communicate with each lower ECU 300 by using an ID (identifier) of each lower ECU 300. However, initially, it is unknown where the lower ECUs 300 corresponding to the respective IDs are connected.

Figures 7, 8:
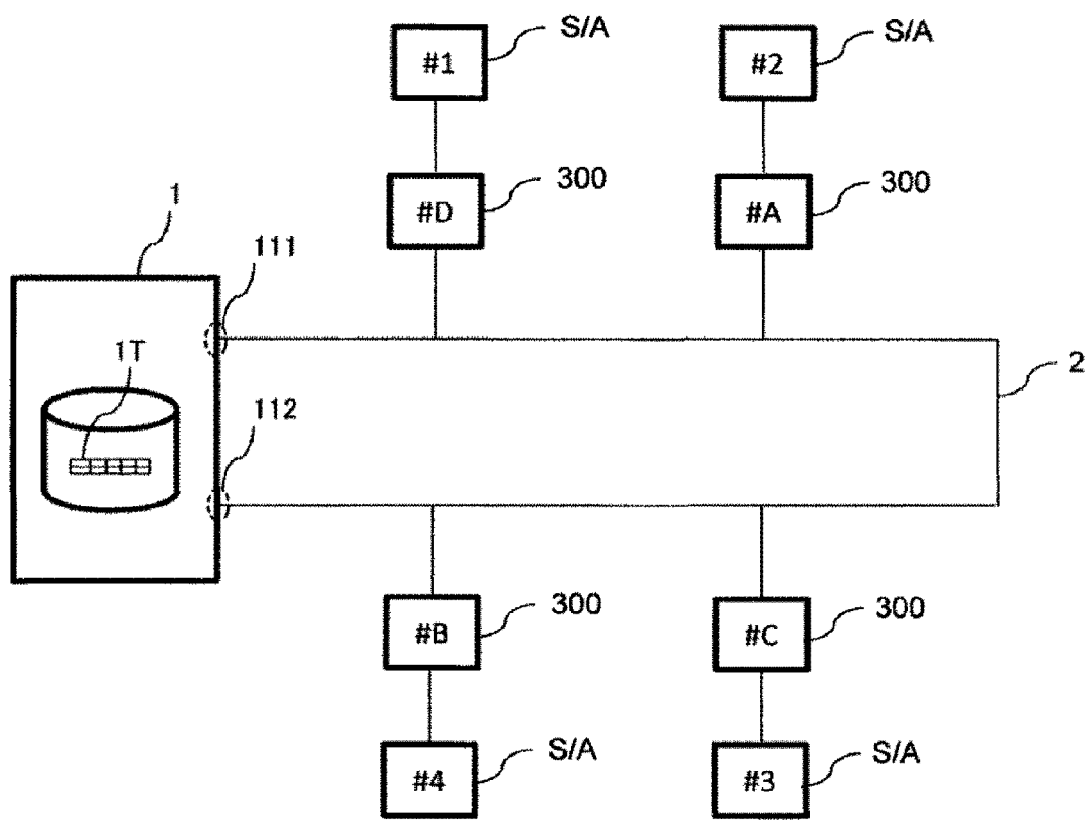
FIG. 7 is a table for storing the order of IDs of sensors or actuators and the order of the IDs of lower ECUs.
FIG. 8 is a schematic diagram illustrating the system after the order of the lower ECUs is identified.

FIG. 7 is a diagram illustrating a table 1T included in a nonvolatile memory of the higher ECU 1 (e.g., a flash memory or the like built into a higher controller 12). In a first record of the table 1T, the order of the IDs of the respective S/As is stored as design information. In the example of FIG. 7, the first record of the table 1T shows that an S/A with an ID #1 is connected to the first lower ECU 300, an S/A with an ID #2 is connected to the second lower ECU 300, an S/A with an ID #3 is connected to the third lower ECU 300, and an S/A with an ID #4 is connected to the fourth lower ECU 300, in sequence from the port 111 of the bus wiring 2.

The higher ECU 1 identifies the order of the four lower ECUs 300 on the bus wiring 2 by arranging differences between current values (Is1−Is2) measured for each of the lower ECUs 300 in descending order. Then, the higher ECU 1 stores the order of the IDs of the lower ECUs 300 as the second record of the table 1T. In the example of FIG. 7, the second record of the table 1T shows that the ID of the first lower ECU 300 is #D, the ID of the second lower ECU 300 is #A, the ID of the third lower ECU 300 is #C, and the ID of the fourth lower ECU 300 is #B, in sequence from the port 111 of the bus wiring 2.

As illustrated in FIG. 8, the higher ECU 1 compares the first record and the second record of the table 1T with each other to identify that the S/A of #1 is connected to the lower ECU 300 of #D, the S/A of #2 is connected to the lower ECU 300 of #A, the S/A of #3 is connected to the lower ECU 300 of #C, and the S/A of #4 is connected to the lower ECU 300 of #B.

As described above, according to the present embodiment, it is possible to identify the order of communication apparatuses connected to a bus while minimizing manufacturing cost.

Variations of Embodiment

In the present embodiment, the current detecting resistors 141 and 142 are used to detect current at the respective ports. However, as long as current can be detected, a current detection device having another form may be used. For example, a current sensor being a Hall sensor may be used to obtain the same effects.

In addition, as described above, the main object of the embodiments of the present invention is to determine whether each lower ECU is in charge of which actuator or the like, but continuous measurement of the connection positions even during operation of the system 100 enables the presence or absence of abnormality in a lower controller and wiring to be diagnosed on the basis of the presence or absence of a change. That is because when measurement results of a connection position significantly change though the connection position or a wiring configuration is not changed, it can be determined that some abnormality has occurred in the lower controller or wiring.

In other words, when the current Is1 (first current value) and the current Is2 (second current value) measured for a target communication apparatus being one of the plurality of lower ECUs 301 to 304 change over time, the higher controller 12 (controller) determines that a failure has occurred in the target communication apparatus or the bus wiring 2 (bus). When determining that a failure has occurred, the higher controller 12 informs that a failure has occurred, for example, by turning on a warning light.

Figure 3:
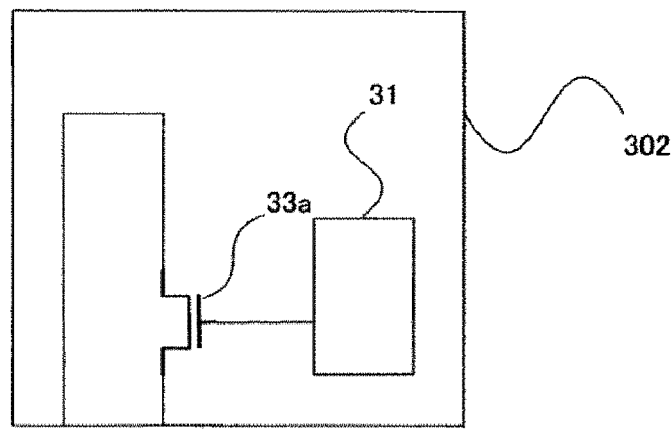
FIG. 3 is a circuit block diagram illustrating a configuration of a lower ECU according to a modification.

In the present embodiment, as a device for passing the measurement current I0, a configuration in which the load resistor 32 and the switch 33 are connected in series is used, but as illustrated in FIG. 3, a configuration which uses only a MOSFET 33a saturated while being turned on may be used to pass desired measurement current I0.

In other words, each current applying device CA includes the MOSFET 33a and the lower controller 31 (controller). The MOSFET 33a is connected between the wiring line 21 and the wiring line 22. When receiving the command to apply current to the bus wiring 2 (bus), the lower controller 31 controls gate voltage of the MOSFET 33a to saturate the MOSFET 33a. Compared to the first embodiment, the number of elements of the current applying device CA is reduced, and the manufacturing cost can be minimized.

In addition, as long as a mounted device has such a configuration to change impedance between the wiring lines 21 and 22 to pass current, the mounted device is not limited to the description herein.

Furthermore the present embodiment shows an example of the bus wiring 2 constituted by two wiring, but the bus wiring 2 may be constituted by three or more wiring.

Second Embodiment

Difference from First Embodiment

Figure 4:
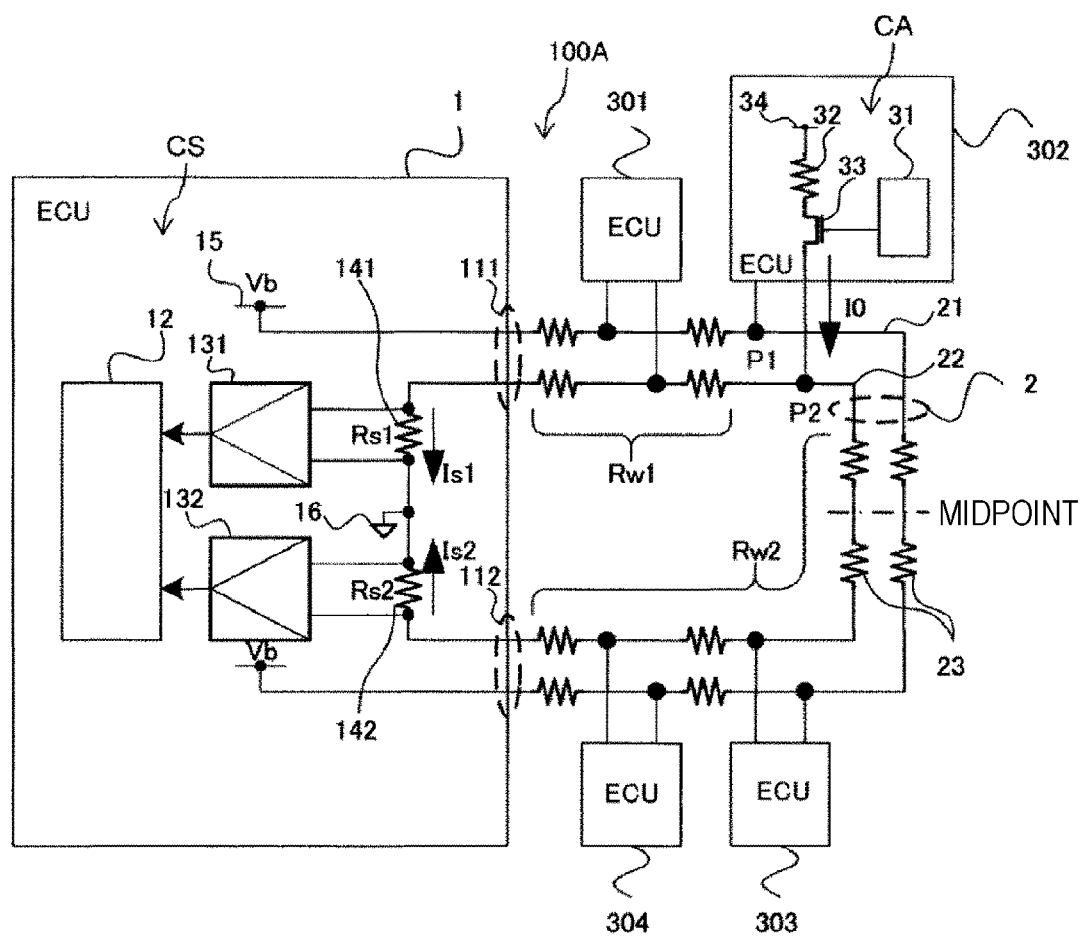
FIG. 4 is a circuit block diagram illustrating a connection configuration of an electronic controller and the like according to a second embodiment.

Next, a configuration and operation of a system 100A including the higher ECU 1 as the electronic controller according to a second embodiment of the present invention will be described with reference to FIG. 4.

The configuration of the system 100A according to the present embodiment is the same as that of the first embodiment except that the lower ECUs 301 to 304 each internally include a lower-ECU internal power supply 34. The load resistor 32 (resistor) is connected to the lower-ECU internal power supply 34 (internal power supply).

Operation according to the present embodiment is the same as that of the first embodiment except that impedance between the lower-ECU internal power supply 34 and the wiring line 22 is changed to pass the measurement current I0, although the measurement current I0 is passed by changing the impedance between the wiring lines 21 and 22 in the first embodiment.

The present embodiment is effective when power supply voltage at which the lower ECUs 301 to 304 operate and voltage of the power supply 15 of the higher ECU 1 are different from each other.

Third Embodiment

Difference from First Embodiment

Figure 5:
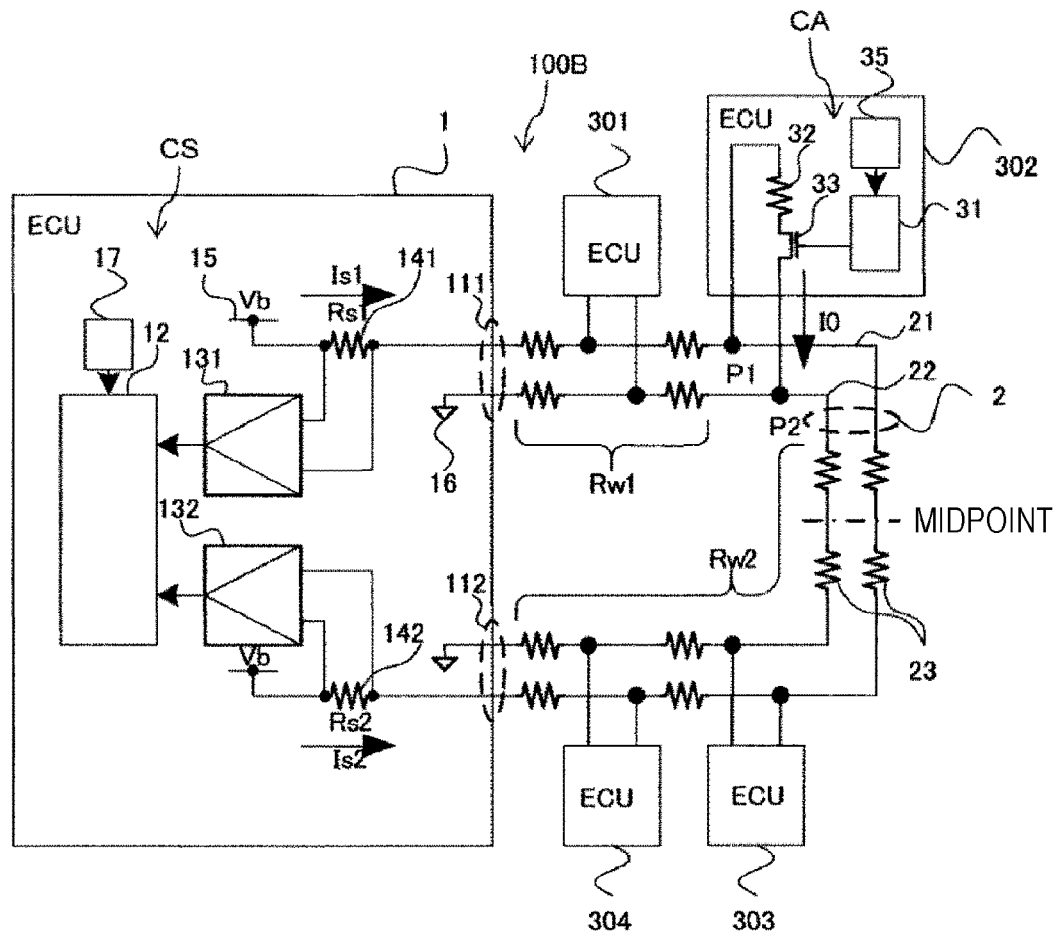
FIG. 5 is a circuit block diagram illustrating a connection configuration of an electronic controller and the like according to a third embodiment.

Next, a configuration and operation of a system 100B including the higher ECU 1 as the electronic controller according to a third embodiment of the present invention will be described with reference to FIG. 5.

The configuration of the system 100B according to the present embodiment is the same as the configuration of the system according to the first embodiment except that pattern generators 17 and 35 are connected respectively to the higher controller 12 and each lower controller 31 in addition to the configuration of the system according to the first embodiment.

Operation of the electronic controller and the like according to the present embodiment which is different from that of the first embodiment will be mainly described. The pattern generators 17 and 35 both generate an identical time-series pattern with high autocorrelation.

The lower controller 31 turns on/off a switch 33 according to the pattern given from the pattern generator 35. Accordingly, the measurement current I0 is modulated according to the pattern. Then, the higher controller 12 demodulates detected values of Is1 and Is2, obtained by dividing I0, according to the pattern given from the pattern generator 17, and measures a connection place of the lower ECU 302 as the target on the basis of the magnitudes of the demodulated values of Is1 and Is2.

In other words, each of the plurality of lower ECUs 301 to 304 (communication apparatuses) includes the pattern generator 35 for generating the time-series pattern with high autocorrelation. When receiving the command to apply current to a bus wiring 2 (bus), the lower controller 31 (controller) turns on/off the switch 33 according to the time-series pattern generated by the pattern generator 35. The higher ECU 1 as the electronic controller includes the pattern generator 17 for generating the time-series pattern with high autocorrelation. The higher controller 12 (controller) demodulates the current Is1 (first current value) and the current Is2 (second current value) according to the time-series pattern generated by the pattern generator 17.

According to the present embodiment, modulation and demodulation by using the time-series pattern with high autocorrelation in this way increase resistance to noise compared with that of the first embodiment. A maximum length sequence (M-sequence) can be used as a representative time-series pattern with high autocorrelation. In addition, a Gold sequence derived from the M-sequence is also useful. In addition to this, the same object can be achieved with a sequence having high autocorrelation.

Note that the present invention is not limited to the above embodiments and may include various modifications. For example, the above embodiments are described in detail for ease of understanding the present invention, and therefore, the present invention is not necessarily limited to a configuration including all of the configurations described above. Furthermore, part of a configuration of an embodiment can be replaced with a configuration of another embodiment, and a configuration of an embodiment can be added to a configuration of another embodiment. Still furthermore, for part of the configurations of the respective embodiments, additions, eliminations, or substitutions of another configuration may be made.

Furthermore, the configurations, functions, and the like described above may be partially or wholly achieved by hardware, such as a designed integrated circuit. In addition, each of the above-described configurations, functions, and the like may be achieved with software so that a processor (controller) interprets and executes a program for achieving each function. Information such as programs, tables, files which achieve functions can be stored in a recording device, such as memory, hard disk, or solid state drive (SSD) or a recording medium, such as IC card, SD card, or DVD.

The embodiments of the present invention may include the following aspects:

(1) An electronic controller connected to a plurality of lower controllers by bus wiring, the electronic controller including two or more wiring connection ports, and a device for detecting wiring current at each of the wiring connection ports, in which a position of a specific lower controller on the wiring is measured on the basis of a relationship between two detected values of a current applied by the specific lower controller detected at the respective connection ports.

(2) In the electronic controller according to (1), the number of the wiring connection ports is two, and the two wiring connection ports are connected by the bus wiring into a loop shape.

(3) In the electronic controller according to (1) and (2), the relationship between two detected values represents a difference between the two detected values.

(4) In the electronic controller according to (3), the relationship between two detected values represents a value obtained by further dividing the difference between the two detected values by a sum of the two detected values.

(5) In the electronic controller according to (1) and (2), the position of the specific lower controller on the wiring is identified according to a magnitude relationship between the detected values in the plurality of lower controllers.

(6) In the electronic controller according to (1) and (2), a shunt resistance method is used for current detection at each connection port, and a resistance value of the shunt resistor is smaller than a total wiring resistance value of the bus wiring.

(7) In the electronic controller according to (1) and (2), the two detection values are continuously measured, and the presence or absence of abnormality in each of the lower controllers and the wiring is diagnosed from a change in the two detection values.

(8) In the electronic controller according to (1) and (2), a device for applying a current by each of the lower controllers is configured to change impedance between wiring of the bus wiring.

(9) In the electronic controller according to (8), a device for changing the impedance is constituted by connecting a resistor and a switch in series.

(10) In the electronic controller according to (8), the device for changing the impedance is constituted by a MOSFET, and the MOSFET is saturated when current is applied.

(11) In the electronic controller according to (1) and (2), the device for applying a current by each of the lower controllers is configured to apply a current from an internal power supply of the lower controller.

(12) In the electronic controller according to (1) and (2), a pattern with high autocorrelation is used for a time-series pattern of a current applied by each of the lower controllers.

(13) In the electronic controller according to (12), the time-series pattern of a current is an M sequence or a sequence derived from the M sequence.

According to (1) to (13) described above, an inexpensive and highly reliable electronic controller can be provided, which is configured to automatically measure a connection position of a lower ECU with high resolution without using a circuit operating at high speed, or an actuator or sensor including the electronic controller can be provided.

REFERENCE SIGNS LIST 1 higher ECU
2 bus wiring
12 higher controller
15 power supply
17 pattern generator
21, 22 wiring
23 wiring resistance
31 lower controller
32 load resistor
33 switch
33a MOSFET
34 lower-ECU internal power supply
35 pattern generator
100, 100A, 100B system
111, 112 port
131, 132 amplifier
141, 142 current detecting resistor
301 to 304 lower ECU
CS current sensor
CA current applying device

The invention claimed is:

1. An electronic controller comprising:
a first port to which one end of a bus configured to connect a plurality of communication apparatuses is connected;
a second port to which the other end of the bus is connected;
a current sensor which measures a first current value of current flowing through the first port and a second current value of current flowing through the second port, the current being applied to the bus by each of the plurality of communication apparatuses; and
a controller which identifies an order of the plurality of communication apparatuses on the bus on the basis of the first current value and the second current value measured for each of the plurality of communication apparatuses,
wherein the controller is configured to determine a difference between the first current value and the second current value measured for each of the plurality of communication apparatuses, and
wherein the controller is configured to identify the order of the plurality of communication apparatuses on the bus on the basis of a ratio of the difference between the first current value and the second current value which are measured for each of the plurality of communication apparatuses to a sum of the first current value and the second current value.

2. The electronic controller according to claim 1, wherein the controller transmits a command to apply current to the bus to each of the plurality of communication apparatuses.

3. The electronic controller according to claim 1, further comprising
a pattern generator which generates a time-series pattern with high autocorrelation, wherein the controller demodulates the first current value and the second current value according to the time-series pattern.

4. The electronic controller according to claim 1, wherein the current sensor measures current by using a shunt resistor, and the shunt resistor has a resistance value smaller than a resistance value of the bus extending from the first port to the second port.

5. The electronic controller according to claim 1, wherein the controller, when the first current value and the second current value measured for a target communication apparatus being one of the plurality of communication apparatuses change over time, determines that a failure has occurred in the target communication apparatus or the bus.

6. A communication apparatus connected to a bus including a first wiring line and a second wiring line, the apparatus comprising a current applying device which, when receiving a command to apply current to the bus, changes impedance between the first wiring line and the second wiring line and passes current between the first wiring line and the second wiring line, wherein the current applying device includes:

a resistor and a switch which are connected in series between the first wiring line and the second wiring line; and a controller which turns on the switch when receiving the command, a pattern generator which generates a time-series pattern with high autocorrelation, and wherein the controller, when receiving the command, turns on/off the switch according to the time-series pattern.

7. The communication apparatus according to claim 6, wherein the current applying device includes:

a MOSFET which is connected between the first wiring line and the second wiring line, wherein the controller saturates the MOSFET when receiving the command.

8. The communication apparatus according to claim 6, further comprising an internal power supply, wherein the resistor is connected to the internal power supply.

* * * * *